United States Patent
Brückner et al.

(10) Patent No.: US 6,712,199 B1
(45) Date of Patent: Mar. 30, 2004

(54) DEVICE FOR CONTROLLING AND MONITORING A CONVEYOR BELT, NOTABLY A TUBULAR CONVEYOR BELT

(75) Inventors: Joachim Brückner, Hamburg (DE); Karl-Heinz Elvers, Buxtehude (DE); Wolfgang Schnell, Hamburg (DE)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 09/762,412

(22) PCT Filed: May 23, 2000

(86) PCT No.: PCT/DE00/01653
§ 371 (c)(1), (2), (4) Date: Feb. 7, 2001

(87) PCT Pub. No.: WO00/76884
PCT Pub. Date: Dec. 21, 2000

(30) Foreign Application Priority Data

Jun. 11, 1999 (DE) .......................... 199 26 560

(51) Int. Cl.[7] .............................. B65G 43/00
(52) U.S. Cl. .................................. 198/810.03
(58) Field of Search ............... 198/502.1, 810.02, 198/810.03, 819

(56) References Cited

U.S. PATENT DOCUMENTS 4,854,446 A * 8/1989 Strader ............... 198/810.02
6,047,814 A * 4/2000 Alles et al. ............ 198/810.02
6,264,977 B1 * 7/2001 Hoffmann .............. 198/810.02

FOREIGN PATENT DOCUMENTS

| DE | 195 22 757 | 6/1995 |
| JP | 08 244952 | 1/1997 |
| JP | 09 169423 | 10/1997 |

* cited by examiner

Primary Examiner—Joseph E. Valenza
(74) Attorney, Agent, or Firm—Collard & Roe, P.C.

(57) ABSTRACT

The invention relates to a device for controlling and monitoring a conveyor belt which is made of rubber or a rubber-like plastic material and preferably provided with embedded reinforcements. By overlapping of the longitudinal edges of the conveyor belt the belt can be closed such that it forms a tubular conveyor belt which is supported on all sides by idler wheels. The device also comprises at least the following components: at least one detectable element which is integrated into the conveyor belt and notably takes the form of several elements which in the longitudinal and/or transverse direction are positioned at distances from each other; and at least one scanning unit with which the precise position of the belt can be determined in a non-contacting manner by detection of the element or elements. The device provided for by the invention is characterized in that the detectable element is an induction loop and/or a transponder, a metal particle or a permanent magnet. The scanning unit is advantageously configured as a system of several detector elements which form a detector chain.

4 Claims, 4 Drawing Sheets

DEVICE FOR CONTROLLING AND MONITORING A CONVEYOR BELT, NOTABLY A TUBULAR CONVEYOR BELT

Applicants claim priority under 35 U.S.C. 119 of German Application No. 199 26 560.7 filed Jun. 11, 1999. Applicants also claim priority under 35 U.S.C. 371 of PCT/DE00/01653 filed May 23, 2000. The international application under PCT article 21(2) was not published in English.

DESCRIPTION

The invention relates to a device for controlling and monitoring a conveyor belt made of rubber or a plastic similar to rubber, said conveyor belt preferably being provided with embedded reinforcements, whereby in particular the conveyor belt can be closed by overlapping its longitudinal edges in such a way that it forms a tubular conveyor belt that is supported on all sides by idler rollers (encapsulated conveyance); and whereby, furthermore, the device comprises at least the following components:

At least one detectable element that is integrated in the conveyor belt, in particular in the form of a plurality of elements which are positioned in the longitudinal and/or transverse directions spaced from each other; as well as at least one scanning unit with which the precise position of the belt can be determined in a non-contacting manner by detection of the element or elements.

In the operation of conveyor installations, conveyor belts frequently run off course from the ideal position while they are in operation. Especially within the framework of encapsulated conveyance, conveyor belts may get twisted under certain operating conditions. The causes for this may be of different types such as, for example uneven loading, guidance through curves, or poorly aligned systems. It is important to the operator of the conveyor in this connection to obtain information about the position of the conveyor belt in order to initiate countermeasures against uncontrolled migration of the belt from its correct course.

Now, a device of the type specified above is introduced in laid-open patent specification DE-OS 195 22 757 A1, specifically in the form of the two following variations:

The conveyor belt is provided on its outer side with a color marking that is optically detected. This, however, preconditions that the surface marking is not damaged or soiled, which, however, cannot be avoided in most cases. The result then is that the device is incapable of serving its function, or can function properly only in a limited manner.

The conveyor belt has integrated indicators especially in conjunction with steel cable belts, whereby individual cables or cords are replaced by an indicator. The drawback in this case is that the behavior of the conveyor belt as a pulling carrier means is impaired in a negative way.

Therefore, the problem of the invention is to provide a device that excludes the drawbacks specified above. Furthermore, the device is expected to be employable for all types of conveyor belts (steel cable conveyor belts, textile conveyor belts, aramid conveyor belts) as well as for all types of different conveyor system configurations (curves, gradients etc.) especially under the aspect of encapsulated conveyance.

Said problem is solved according to the characterizing part of patent claim 1 in that the detectable element is an induction loop and/or a transponder, a metal particle or a permanent magnet.

The induction loop is advantageously combined with a transponder. The induction loop may be formed by a metal cord. The use of a conductive polymeric material particularly based on rubber or a plastic is suited for said purpose as well.

The detectable element is advantageously completely embedded in the conveyor belt, and in conjunction with a steel cable conveyor belt exclusively embedded within its running side. In conjunction with a textile conveyor belt or an aramid conveyor belt, the detectable element is usefully arranged exclusively within the reinforcement. The scanning unit is in this connection facing the running side of the conveyor belt.

The detectable element is installed either in the course of manufacture of the conveyor belt or at a later time.

The following two variations are useful with respect to the position of the detectable element:

The element is arranged within the zone of the center of the conveyor belt, specifically based on the width of the conveyor belt (center interrogation);

the element is arranged in one of the two edge zones (edge interrogation).

It is particularly advantageous if the scanning unit is a system of a plurality of detector elements forming a chain of detectors (series connection). The chain of detectors consists in this connection of at least two, in particular three to twenty, and again particularly of three to nine detector elements. This form of embodiment of the scanning unit is particularly suitable for detecting linear positional deviations and/or angular deviations (twisting).

All physical principles by which the installed elements can be detected with the help of methods of measurement technology are suited for the detection, whereby the following has to be noted in view of the elements specified in the characterizing part of claim 1:

Induction loops and/or transponders can be detected by means of special antennas with a suitable directional characteristic.

Metal elements can be detected by means of inductive methods such as, for example by the eddy current method, radar or microwaves, or ionizing radiation or ultrasound.

Permanent magnets can be detected by all magnet-sensitive methods. Such methods may be, for example magnetic inductive methods, magnetoresistive sensors, or Hall effect sensors.

All detection possibilities specified above can be realized in the form of a chain of detectors serving as the scanning unit.

The scanning unit is installed in discrete sites (problem zone) of the device. The size of the detectable elements and also the size and type of scanning unit employed are determined in this connection by the resolution of the measured values and the measuring accuracy, whereby the use of the aforementioned detector chain offers a special advantage under said aspect as well.

Furthermore, control circuits can be set up with the help of suitable control elements. Such control circuit ensure that the belt is guided in a stable position in an operationally safe manner. In the extreme case, the conveyor system is shut down when permissible limit values are exceeded.

The invention is now explained with the help of exemplified embodiments and by reference to schematic drawings, in which:

FIG. 1 shows a flat conveyor belt with edge interrogation.

FIGS. 2a, b show a flat conveyor belt with center interrogation.

Figures 4A, 4B:
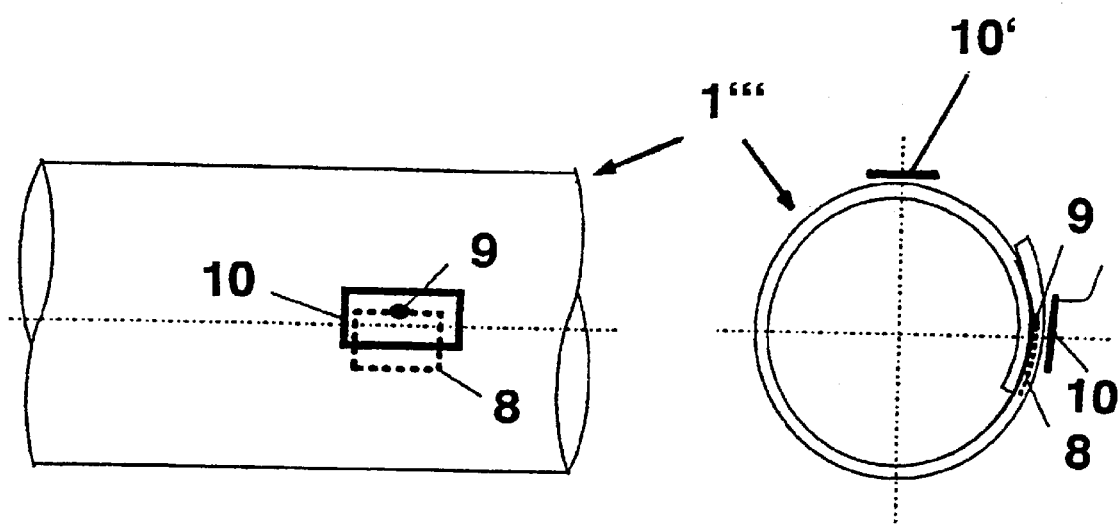

FIGS. 4a, b show a "belt twisting" edge interrogation.

Figure 1:
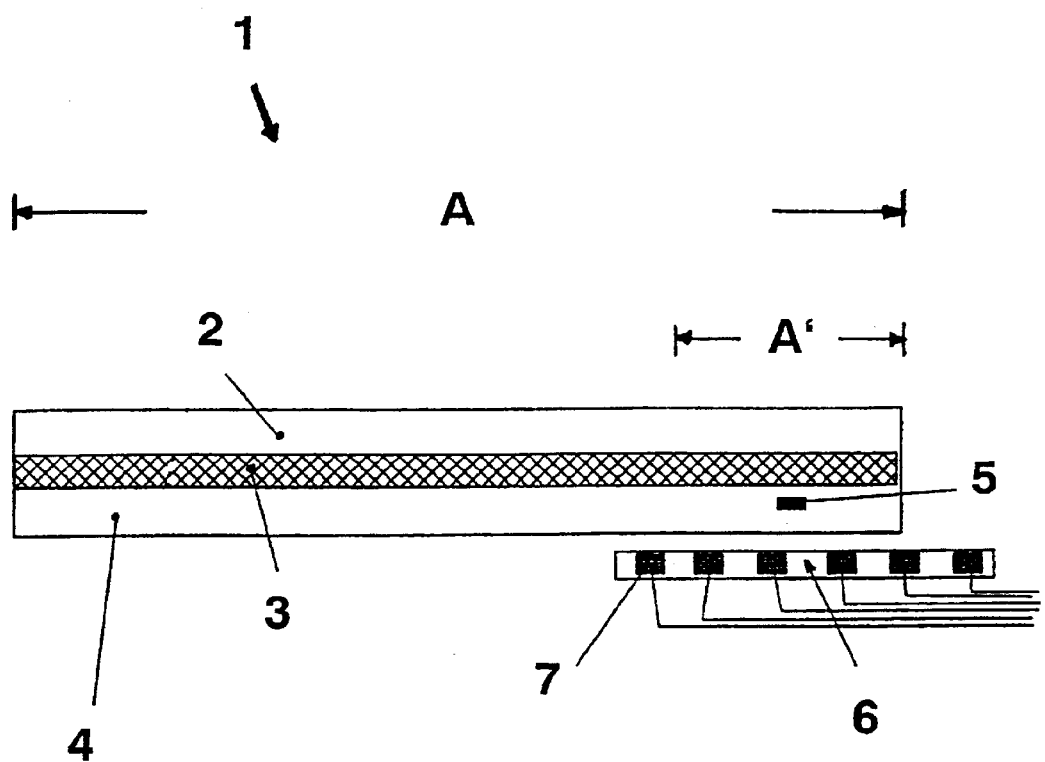
Figures 2A, 2B:
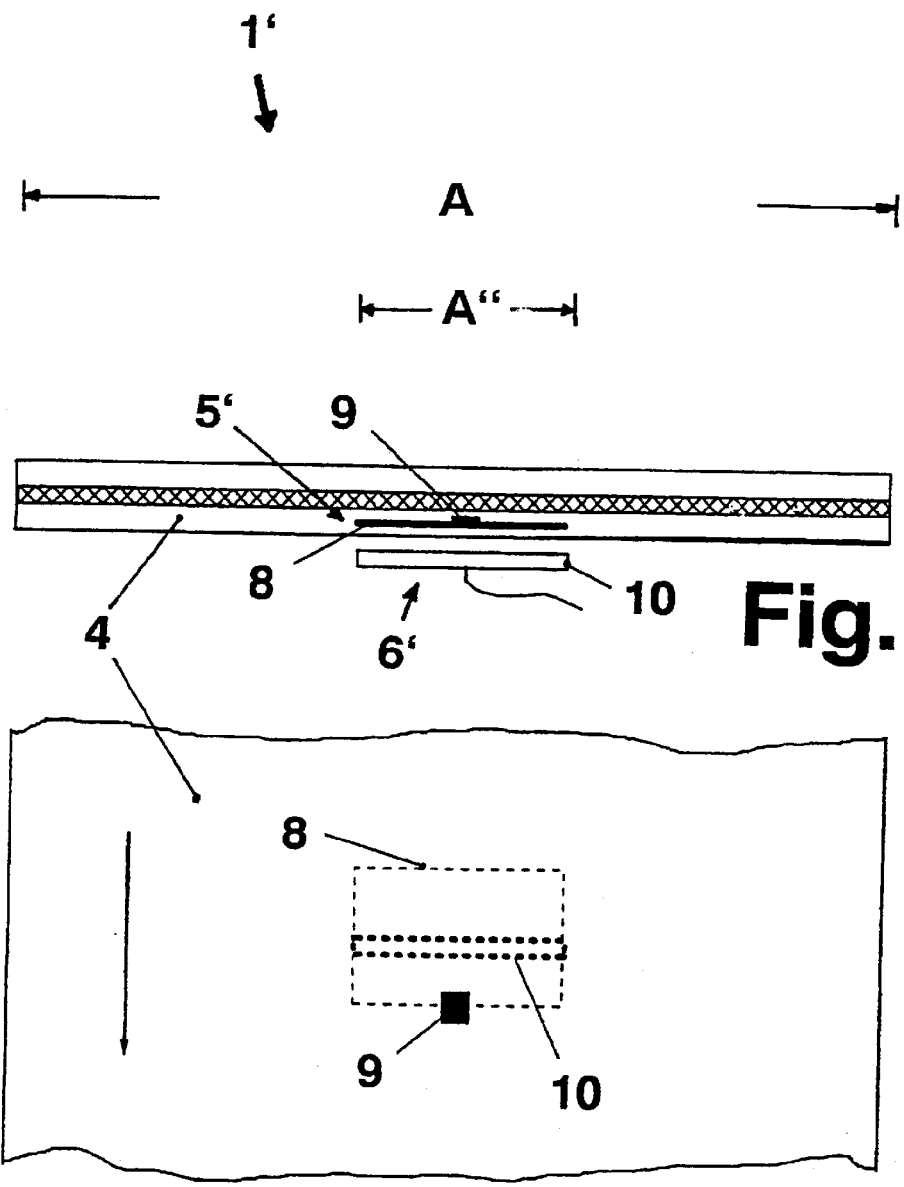

FIGS. 1, 2a, 3a, 3b and 4b show cross sectional representations, whereas FIGS. 2b and 4a represent a view of the running side of the conveyor belt or tubular conveyor belt.

The following list of reference numerals and symbols applies in conjunction with said figures:
1 Conveyor belt
1' Conveyor belt
1" Conveyor belt (tubular conveyor belt)
1''' Conveyor belt (tubular conveyor belt)
2 Carrying side
3 Reinforcement
4 Running side
5 Detectable element
5' Detectable element
6 Scanning unit
6' Scanning unit
7 Detector element
8 Induction loop
9 Transponder
10 Antenna
10' Antenna
A Width of conveyor belt
A' Edge zone
A" Center zone of conveyor belt FIG. 1 shows a conveyor belt 1 with an overall width A comprising a carrying side 2, an embedded reinforcement 3, and a running side 4. Now, a detectable element 5 (e.g. a permanent magnet) is arranged in one of the two edge zones A' within the running side 4, specifically with a complete jacketing in the form of rubber or a plastic similar to rubber.

The scanning unit 6, by which the running side 5 of the conveyor belt 1 is passing in a non-contacting manner within the framework of an edge interrogation, consists of a detector chain comprising a total of six detector elements 7.

FIG. 2a shows a conveyor belt 1' with an overall width A, whereby the detectable element 5' is arranged in the present case within the zone of the conveyor belt center A", specifically within the running side 4. Said detectable element consists of an induction loop 8 and a transponder 9.

In the present case, the scanning unit 6' is an antenna 10 within the framework of a center interrogation.

Viewing the running side 4 of the conveyor belt and its running direction (direction of arrow), FIG. 2b illustrates again the cooperation between the induction loop 8, the transponder 9 and the antenna 10.

Figure 3A:
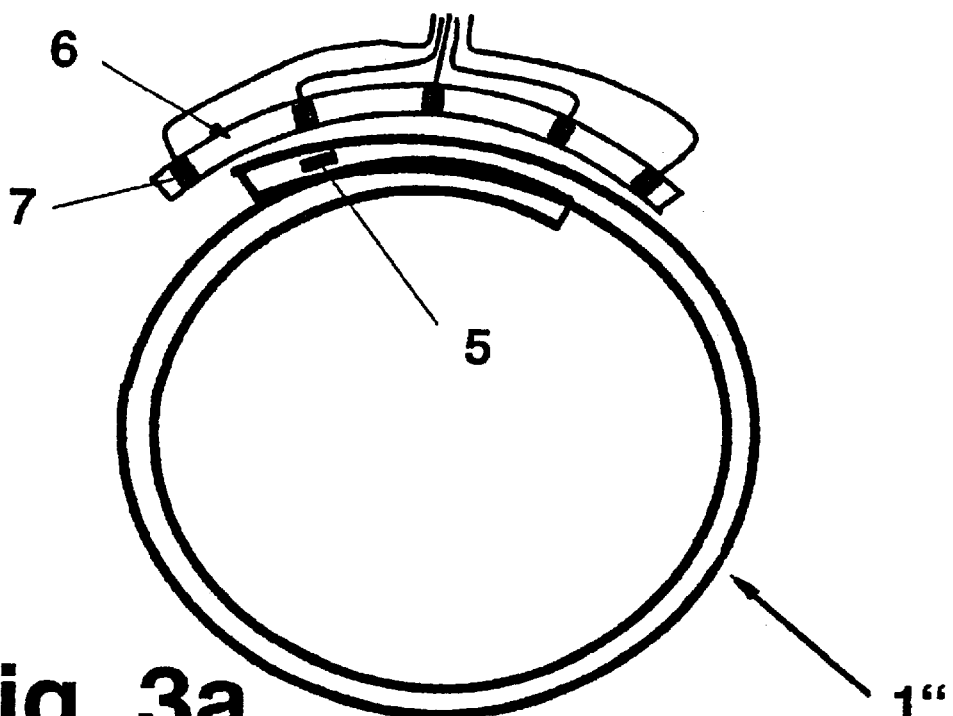
FIG. 3a shows a tubular conveyor belt with edge interrogation.

According to FIGS. 3a, b, the conveyor belt 1" is closed by overlapping its longitudinal edges so as to form a tubular conveyor belt, whereby the zone of overlapping comes to be located at the top (optimal constellation). An edge interrogation (FIG. 3a) or a center interrogation (FIG. 3b) takes place in the present case by means of the detectable element 5 and the scanning unit 6 comprising a detector chain with the five detector elements 7.

Figure 3B:
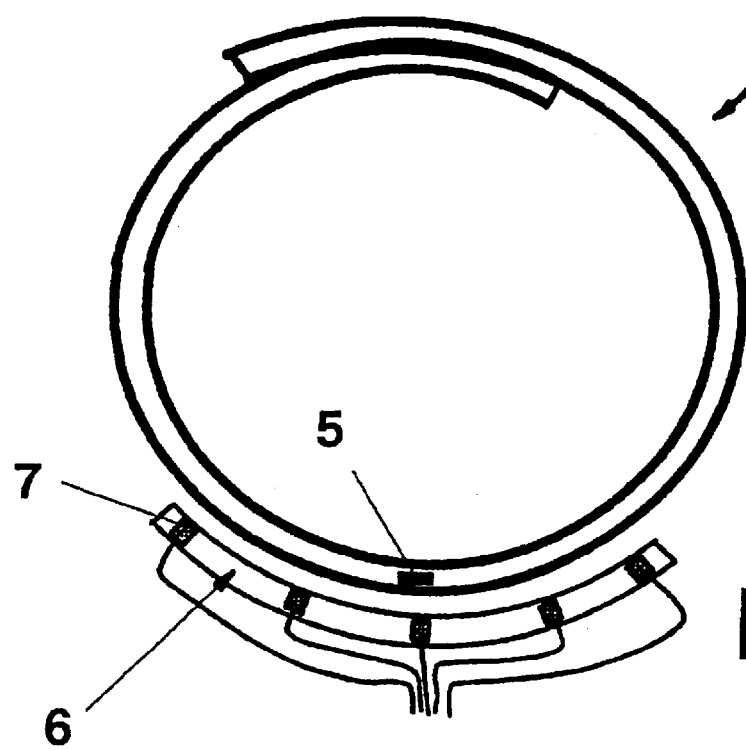
FIG. 3b shows a tubular conveyor belt with center interrogation.

Now, if the tubular conveyor belt according to FIGS. 3a, 3b is twisted sideways (situation according to FIGS. 4a, b) in a way such that the detectable element 5 is no longer detected by the scanning unit 6, which is in a fixed position, the conveyor device is shut down.

According to FIGS. 4a, b, the tubular conveyor belt 1''' is twisted in such a way that the zone of overlap of the longitudinal edges is located sideways (twisted belting). Through cooperation between the induction loop 8, the transponder 9 and the antenna 10, said position of the belt is now determined within the framework of an edge interrogation in order to initiate countermeasures. Within the framework of said exemplified embodiment, the antenna 10 assumes the scanning function of the antenna 10', the latter being located in the optimal overlap position of the tubular conveyor belt.

The principle of arranging the scanning unit around a tubular conveyor belt is dependent upon the way in which the conveyor belt installation is operating.

What is claimed is:

1. A device for controlling and monitoring a tubular conveyor belt (1, 1', 1", 1''') made of rubber or a plastic similar to rubber, said conveyor belt being provided with embedded reinforcements (3), whereby the conveyor belt can be closed by overlapping its longitudinal edges so as to form a tubular conveyor belt (1", 1'''), the latter being supported on all sides by idler rollers, and whereby, furthermore, the device comprises at least the following components:

at least one detectable element (5, 5') integrated in the conveyor belt in the form of a plurality of elements, the latter being arranged in the longitudinal and/or transverse directions with a spacing from each other, said detectable element being arranged in at least one of two edge zones of the conveyor belt; as well as at least one scanning unit (6, 6'), by means of which the position of the belt is exactly determined by detecting the elements in a non-contacting manner;

characterized in that the detectable element (5, 5') is a combination system comprising an induction loop (8) and a transponder (9) and the detectable element is completely embedded in the conveyor belts, wherein the scanner, induction loop and transponder interact to monitor if the longitudinal edges of the tubular conveyor belt overlap in order to detect if the tubular conveyor belt has become twisted.

2. The device according to claim 1, characterized in that the induction loop (8) is formed by a metal cord.

3. The device according to claim 1, characterized in that the induction loop (8) is formed by a conductive polymeric material in particular based on rubber or a plastic.

4. The device according to claim 1, characterized in that the scanning unit (6, 6') is facing the running side (4) of the conveyor belt.

* * * * *